United States Patent [19]
Sokolies

[11] 3,748,783
[45] July 31, 1973

[54] SEALED LIVE PLANT CONTAINER AND METHOD

[76] Inventor: Alfred Hienz Sokolies, 3612 Woodlawn, Gurnee, Ill. 60031

[22] Filed: Apr. 13, 1971

[21] Appl. No.: 133,618

[52] U.S. Cl.................. 47/58, 206/46 PL, 119/1, 47/34, 47/34.11
[51] Int. Cl................................. A01g 9/02
[58] Field of Search............. 47/1.4, 58, 37; 119/1, 3, 5; 128/142; 220/82 R; 206/45.34

[56] References Cited
UNITED STATES PATENTS

| | | | |
|---|---|---|---|
| 3,155,609 | 11/1964 | Pampel | 119/1 |
| 3,168,887 | 2/1965 | Bodell | 119/3 |
| 3,269,578 | 8/1966 | Lewis | 119/5 |
| 3,283,743 | 11/1966 | Dibelius | 119/1 |
| 3,320,697 | 5/1967 | Larsen | 42/58 |
| 3,420,739 | 1/1969 | Bongers et al. | 34/1.4 |
| 3,651,975 | 3/1972 | Callan | 220/6 |
| 2,361,029 | 10/1944 | Heinl | 47/37 |
| 2,720,725 | 10/1955 | Peerless | 47/37 |
| 3,242,614 | 3/1966 | Thompson | 47/34 |

OTHER PUBLICATIONS

Kenneth F. Baker et al., The U. C. System for Producing Healthy Container Grown Plants, 1957.
Richard F. Dempewolff, Gardens to Feed our Spacemen, 1960, Popular Mechanics, June, 1960, p. 123.
New York Times (Caroline Clark), Woodland Safara, Jan. 15, 1954, Section 2 (Gardens).

*Primary Examiner*—Robert E. Bagwill
*Attorney*—Hill, Sherman, Meroni, Gross & Simpson

[57] ABSTRACT

A live plant display assembly comprising a gas-impermeable hollow container sealed from ambient atmosphere and composed of a material transmitting light to a degree sufficient for photosynthesis having an ecologically balanced soil-animal-plant system capable of self-supporting life cycles therein.

12 Claims, 4 Drawing Figures

PATENTED JUL 31 1973 3,748,783

INVENTOR.
ALFRED H. SOKOLIES

BY Hill, Sherman, Meroni, Gross & Simpson
ATTORNEYS

SEALED LIVE PLANT CONTAINER AND METHOD

BACKGROUND OF THE INVENTION

1. Field of the Invention

The invention relates to horticultural displays and more particularly to live plant displays.

2. Prior Art

Potted live plants in open containers and/or terrariums are known. Preservation of cut plants over extended periods of time is also known, for example as disclosed in U.S. Pat. Re 23,625.

At present, one wishing to display live plants over extended periods of time must provide constant attention. Conventional terrariums or other open containers require periodic soil rejuvenation, additions of moisture, fertilizer, etc. This requires time and some specialized knowledge and skills not possessed by a number of persons. Accordingly, it is desirable to provide live plant displays that require minimal time and/or care under all types of conditions so that the ordinary person can acquire a desired horticultural display and maintain it over indefinite periods of time.

SUMMARY OF THE INVENTION

A gas-impermeable container composed of a material transmitting light in a degree sufficient for photosynthesis is air-tightly sealed with an ecologically balanced soil-animal-plant system therein by a non-noxious adhesive material so that an ecologically balanced self-supporting life system is maintained within the container for substantially indefinite periods of time.

A preferred article embodiment of the invention comprises a hollow container member of a given size having at least one opening therein and having a select amount of an ecologically balanced soil-animal-plant system therein which includes at least one live plant, such as of a flowering type, a foliage type or other type, an amount of suitable animal life sufficient to provide an effective symbiotic relation between the plant and animal life, sufficient moisture and atmospheric gases for sustaining the soil-animal-plant system and a soil mixture comprised of a major amount of organic material and a minor amount of inorganic material, a cover member on the opening of the container to seal the opening from ambient atmosphere with both members being composed of a gas-impermeable material and at least one of the members being composed of a material transmitting light to a degree sufficient for photosynthesis and a non-toxic adhesive material sealing the members to one another in a permanent substantially gas-impermeable relation so that an ecologically balanced self-supporting life cycle is enclosed within the display.

BREIF DESCRIPTION OF THE DRAWINGS

DESCRIPTION OF THE PREFERRED EMBODIMENTS

Figure 1:
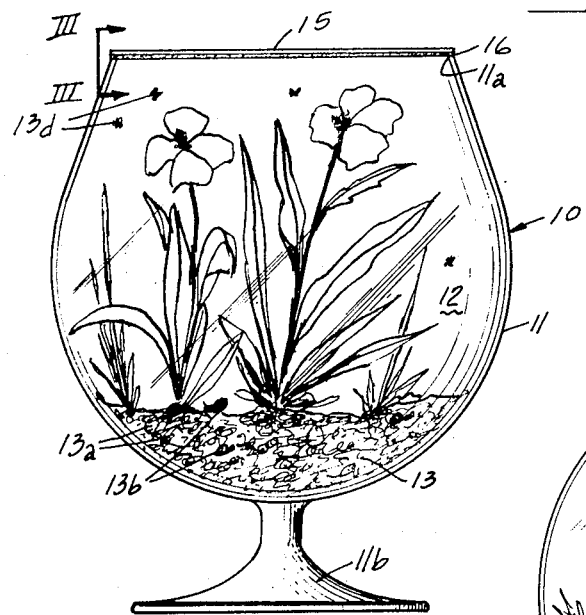
FIG. 1 is an elevational diagrammatic view of an embodiment of the invention.

The invention provides a microcosm of life cycles in the world. An ecologically balanced system comprised of a soil-animal-plant system is provided within a sealed system allowing a substantially indefinite continuation of the life cycles to take place. The animal life consume oxygen and certain nutrients, including dead portions of the plant life, and expels carbon dioxide and nutrient remains. The plant-life consume carbon dioxide and nutrient remains and expels oxygen and animal life nutrients. Both life forms utilize and expel moisture. The system is essentially self-supporting and only requires select amounts of light and heat so as to at least theoretically continue indefinitely.

In accordance with the invention, a suitable hollow container, preferably composed of a material transmitting light to a degree sufficient for photosynthesis, such as glass or plastic (acrylic, etc.) is utilized. The container is of any desired size and shape and is provided with a hollow interior enabling it to contain at least one live plant along with a suitable environment allowing it to continue to live. The container is preferably open at one end thereof to the surrounding atmosphere for positioning of the plant, etc. The peripheral edges of the container at its open end are formed into supporting flange-like portions in certain embodiments so as to support and/or mate with appropriate portions of a cover member. In other embodiments, the peripheral open end edges of the container are relatively straight and follow the side wall portions thereof. A suitable cover member is supported by the peripheral open end edges so as to block the opening and a non-noxious adhesive material substantially permeably bonds the cover member with the container in a substantially gas impermeable seal. Although, if desired, the bond or seal between the container and the cover member can be ruptured without injury to the cover member or the container.

The cover member is preferably a fluid (gas or liquid) impermeable member. Preferably the cover member is composed of a material transmitting light to a degree sufficient for photosynthesis, such as glass or plastic, however translucent, opaque and/or light impermeable materials, such as metal foils, coated cork, wood, certain plastics and other similar materials are all utilizable as cover members.

In certain embodiments, the cover member and the container are formed of the same material. Since the container has a greater viewing area, it is preferably composed of a transparent material, such as a clear or tinted glass or plastic. In certain embodiments the cover member is transparent while the container is non-transparent so that light enters only through the cover member and a plant inside such a non-transparent container is viewed only through the cover member. Various specific materials for the container and cover member have been mentioned, however, other materials are also within the scope of the invention. Essentially, the materials must be non-injurious to plant and animal life, not give off noxious substances, such as vapors or the like, be substantially gas-impermeable and at least one of the materials be capable of transmitting at least those light waves or bands necessary for plant life, i.e., transmitting light to a degree sufficient for photosynthesis.

The adhesive material for bonding the cover member to the container must be capable of forming a substantially gas-impermeable seal between the contacting surfaces and must be non-injurious to plant and animal life. Preferably, the adhesive material forms a substantially rigid bond between the cover member and the container so as to allow the assembled display unit to be moved from place to place without danger of disrupting the sealed plant display unit. Adhesive material useful in accordance with the invention include silicon rubber, beeswax, paraffin, rosin, such as Canadian balsam and other similarly non-injurious adhesive materials. Adhesive materials which give off noxious fumes or the like, for example common hobby cement (air-plane glue) can not be utilized since the noxious fumes kill the plant life. Certain of the noted adhesive materials, for example rosin or beeswax, must be heated prior to the application to the surfaces, and with such materials care must be taken to insure that the hot adhesive material does not contact the plant. A preferred adhesive material is silicon rubber.

The soil mixture of the invention generally comprises potting soil mixtures capable of supporting plant and animal life. Various plants prefer various soil mixtures. Some plants, such as desert-type plants, i.e., cactus, prefer more lean sandy soil, others, such as tropic-type plants, i.e. African violets (Saintpaulia ionantha) prefer a rich organic loamy-type soil. Generally, the soil mixture comprises a major amount of organic material and a minor amount of inorganic material. A particularly well suited general soil mixture for most plants is set forth below:

| MATERIAL | Approx. Amount by Weight |
|---|---|
| Compost | 85% |
| Clay | 1% |
| Sand | 5% |
| Peat Moss | 5% |
| Sphagnum Moss | 3% |
| Animal Life | 1% |

When the selected plant requires somewhat sandier soil, the above general soil mixture is modified by including greater amounts of Sand, up to about 50 percent of the overall mixture, and decreasing the amounts of Compost.

The Sand-Compost mixture generally comprises about 90 percent of the soil mixture and the ratio of Sand to Compost ranges from about 1:15 to about 10:9.

The soil mixture is prepared by adding the selected materials into a given container and mechanically or manually stirring and mixing the materials until a substantially homogeneous soil mixture is attained. In order to insure that this soil mixture does not contain any harmful animal life or the like, it is sterilized, as by heat, ultra-violet light, fumigants, etc., and then is inoculated with a beneficial animal life for example, such as earthworm microbe cultured soil, earthworms, fruit flies, or other similar oxygen-consuming life; for additional exemplary animal life, reference is made to J. Olds *The Encyclopedia of Organic Gardening*, for example pages 9, 697–700–989.985 (Rodale Books, Inc. Emmous, Pa., 1959). An amount of moisture, such as rain water or other relatively pure water, is then added. The amount of moisture is not critical as long as a sufficient amount is added so that the soil mixture is moist to the touch and not soup-like in texture. Generally, the amount of animal life added to the soil mixture is an amount sufficient to provide an effective symbiotic relation between plant and animal life and in numerical units this is about 1 percent by weight of the total soil mixture, although other amounts are usable since equilibrium condition in the soil animal mixture is relatively quickly achieved, as by the availability of the nutrients, etc.

The moist soil mixture-microbe system is then maintained under time-temperature conditions sufficient to establish equilibrium condition therein. Such time-temperature conditions vary in accordance with the soil mixture, moisture content and animal life utilized and generally comprise storing the soil-animal mixture at temperatures of at least 50° F. (10° C.) for a period of time of at least about one week. Should the incubation period extend over an elongated time period, there is a danger that harmful bacteria and/or fungus will infect the soil-animal mixture rendering it unfit for support of plant life.

At least one healthy plant of the flowering type, the foliage type or other type is selected of a size so as to comfortably fit within a particular container. Any size plant can be utilized, as long as a properly sized container is available. In one embodiment, the select plant or plants are potted within the balanced soil-animal mixture so as to provide an amount of balanced soil-animal-plant system, which may then be subdivided into suitable portions for display or the like. For example, at an appropriate time a select portion of this balanced soil-animal-plant system containing at least one plant and sufficient soil-animal mixture therefor is sealed in an appropriate container to provide an ecologically balanced self-supporting system.

In another embodiment, the prepared ecologically balanced soil-microbe system is then placed within a suitable hollowed container in an amount sufficient to provide support for the selected plant root system. This amount can vary from amounts sufficient to cover one half inch to about 1 inch of the interior bottom of the container for small plants up to amounts sufficient to cover at least about 3 inches or more of the interior bottoms of containers for larger plants. The selected live plant is then conventionally potted within the soil-animal mixture in the container so as to provide a balanced soil-animal-plant system. The system is then sealed within the container from surrounding atmosphere by a suitable fluid-impermeable means.

A gas-impermeable cover member of a size sufficient to substantially completely block the passage of fluids into and out of the hollow container is positioned on the open end of the container. The cover member is composed of a variety of materials, including rigid light-transmitting materials, such as glass, plastic, etc., light-impermeable materials such as coated cork (i.e., a cork stopper or the like having a fluid-impermeable coating), wood, metal, ceramic, etc. Preferably, the cover member is composed of a material allowing one to view the plant life within the container.

An adhesive material is placed between the contacting surfaces of the container and the cover member so as to substantially permanently seal one to the other in a gas-impermeable manner. The adhesive material must be selected so as to be fluid impermeable, non-toxic or noxious to the plant or the soil-animal-plant system and be capable of joining the container and the cover member in a substantially permanent relation. Adhesive materials within the adhesive material group having such characteristics include silicon rubber, rosin, beeswax (or other types of wax), paraffin, and other similar natural and/or synthetic adhesive materials. Some such adhesive materials, for example rosin (Canadian balsam rosin or the like) must first be liquefied to render them into a form suitable for application. A preferred embodiment of the adhesive material is silicon rubber, for example, such as available under the tradename "Aquarian Seal-Clear" from the Dow Chemical Company.

The sealed live plant display assembly can be moved from place to place as desired as long as controlled amounts of heat and light are provided. The amounts of light and/or heat required varies for each particular type of plant life and extremes should be avoided. Normal house or office-type light and heat conditions are generally sufficient. Preferably, the sealed display assembly is positioned so as to receive at least some direct sun-type light.

Referring now to the drawings, FIG. 1 illustrates an embodiment 10 having a fanciful container 11, as of glass, with a hollowed interior 12 normally open to ambient atmosphere along the upper edges 11a of the container. The container 11 includes a suitable base portion 11b designed so as to minimize heat transfer between a supporting surface (not shown) and the interior 12 of the container 11. An amount of an ecologically balanced soil-animal mixture 13 sufficient to cover a bottom portion of a container 11 is placed therein. The soil-animal mixture 13 includes a soil mixture 13a of a suitable composition as set forth above and an animal life 13b, including earthworms and/or fruit flies 13d and similar type oxygen consuming life. At least one flowering-type plant 14, such as an African violet is potted within the soil-animal mixture so as to define a balanced soil-animal-plant system. A cover member 15, as of glass, is positioned on the upper edges 11a of the container 11 so as to seal the plant within the container 11. The previously ambient atmosphere is maintained within the container and a substantially gas impermeable non-toxic adhesive material is applied so as to form a seal 16 between the contacting surfaces of the container 11 and the cover member 15 and provides a substantially permanent assembly therebetween.

In controlled studies, various plants have been maintained over prolonged periods of time. The sealed live plants pass through their normal life cycles, i.e., growth, flowering, partial decay, etc., and the ecological balance within the assembled unit is maintained.

Figure 2:
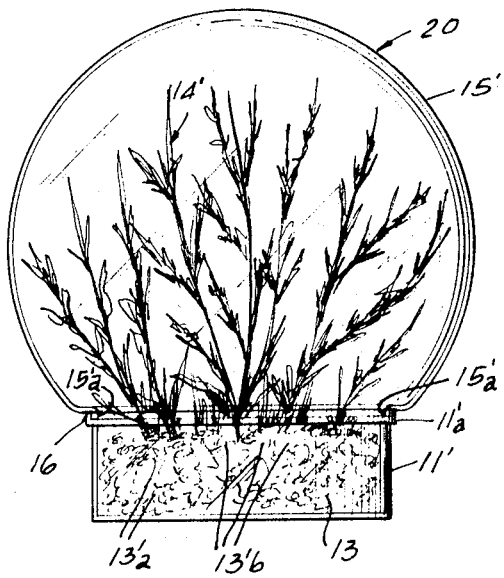
FIG. 2 is an elevational diagrammatic view of another embodiment of the invention.

FIG. 2 illustrates another embodiment 20 having a container 11' composed of a light impermeable material, such as a ceramic or clay pottery. The upper end edges 11'a are formed into flange-like portions for receiving and supporting similarly shaped bottom end edges 15'a of a light-transmitting cover member 15'. The cover member 15' resembles an inverted bowl or the like and encompasses a foliage-type plant 14' within the container 11'. An ecologically balanced soil-animal mixture 13 is positioned within the container 11', similar to that described in connection with embodiment 10. In embodiment 20, the soil-animal mixture comprises a suitable soil mixture 13'a having a suitable soil-based microorganism 13'b therein and fruit flies 13d utilized in embodiment 10 are eliminated for aesthetic purposes.

Figure 3:
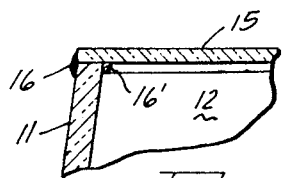
FIG. 3 is a partial diagrammatic view taken substantially along lines III—III of FIG. 1.

FIG. 3 is an enlarged illustration of the seal 16 formed between a container 11 and a cover member 15 by an adhesive material. Preferably, a live plant is potted within the soil-animal mixture in a container, the cover member is positioned on top of the container so as to block the opening thereof, and then an adhesive material is applied, as by a knife applicator or the like, so as to at least overlap portions of the outer surfaces of both the container and the cover member and form an outer seal 16. In other embodiments, the adhesive material is applied either along the upper outside and inside surfaces of the container 11 as well as the upper end edges thereof so that when the cover member 15 is placed thereon, the adhesive member forms a suitable outer seal 16 and a suitable inner seal 16' between the adjacent surfaces; or the adhesive material is applied along the lower outer end portions of a cover member 15 as well as the end edges thereof so that when the cover member is brought into contact with the upper edges of the container, a suitable outer seal 16 and inner seal 16' forms between the adjacent surfaces.

Figure 4:
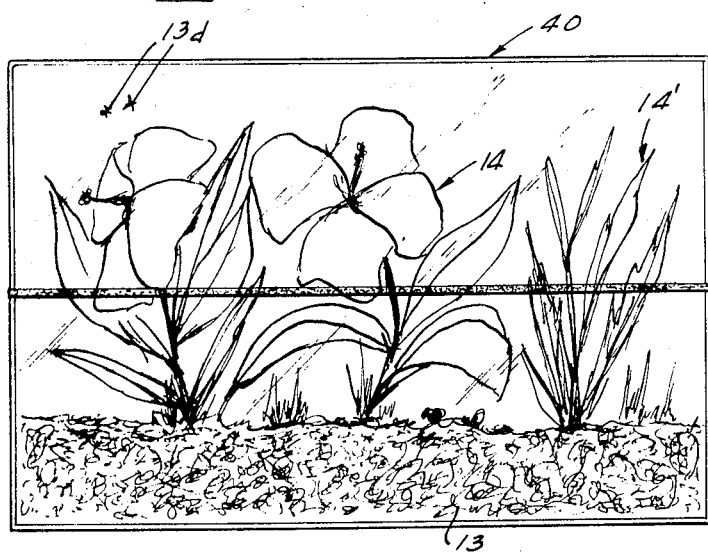
FIG. 4 is an elevational diagrammatic view of yet another embodiment of the invention.

FIG. 4 illustrates another embodiment 40 adapted for larger horticultural displays. A suitably sized light-transmitting container 11'', as of acrylic, is shaped so as to form a rectangular or the like hollowed container and is provided with a soil-animal mixture 13 adapted to support selected live plant life 14 and 14' as well as various animal life, such as fruit flies 13d. A similarly shaped light-transmitting cover member 15'' is positioned so as to block the opening of the container 11'' and an adhesive material, such as silicon rubber or the like, is provided along the adjacent contacting surfaces of the container and the cover member so as to form a substantially permanent fluid-impermeable seal 16.

The described embodiments are illustrative of the invention. The invention provides a sealed live plant display and a method of forming the same allowing one to readily observe an ecologically balanced system having aesthetic appeal and educational value. Observations of a sealed system prepared in accordance with the principle of the invention allow one to realize that there is no waste in the life cycle and that plant and animal life are dependent on each other as well as on soil and atmosphere conditions. After a prepared container is sealed, the plant life utilizes carbon dioxide in the sealed atmosphere and releases oxygen, which is utilized by the animal life in the container. The animal life in turn releases carbon dioxide and the cycle is substantially perpetual. As parts of the plant decay and/or die, such as leaves, flowers, etc., they become a source of nutrients for the animal life and the waste products of the microbes become a source of nutrients for the plant life. This cycle is also substantially perpetual. Similarly, the moisture in the container is utilized by the plant life and then evaporated to condense on the soil and the container surfaces to be utilized by the animal life and again expelled. Accordingly, a complete ecologically balanced system is maintained which requires a minimum of care and can be utilized in substantially all environments.

It will be understood that modifications and variations can be effected without departing from the spirit and scope of the novel concepts of the present invention.

I claim as my invention:

1. A sealed live plant display assembly comprising:
   a container member having a hollow interior chamber of a given size and having at least one opening;

an ecologically balanced soil-animal-plant system positioned within said chamber, said soil-animal-plant system including at least one live plant, an amount of suitable animal life sufficient to provide an effective symbiotic relation between said plant and animal life, sufficient moisture and atmospheric gases for sustaining said plant and animal life and a soil mixture comprised of a major amount of organic material and a minor amount of inorganic material;

a cover member positioned on said opening of said container so as to substantially block ingress and egress of fluids from said chamber;

said members being gas-impermeable and at least one of said members being composed of a material transmitting light to a degree sufficient to permit photosynthesis; and an adhesive material characterized by substantial non-toxicity to said soil-animal-plant system and positioned between contacting surfaces of said members for providing a substantially permanent and substantially gas-impermeable seal between said members, whereby the interior of said display is an ecologically balanced self-supporting life system.

2. A sealed live plant display assembly as defined in claim 1 wherein the container member is composed of a light-transmitting material.

3. A sealed live plant display assembly as defined in claim 1 wherein the cover member is composed of a light-transmitting material.

4. A sealed live plant display assembly as defined in claim 1 wherein the container member is composed of a light-impermeable material.

5. A sealed live plant display assembly as defined in claim 1 wherein the ecologically balanced soil-animal-plant system consists essentially of a soil mixture of compost, clay, sand, peat moss and sphagnum moss in amounts selected for a desired live plant and a suitable animal life.

6. A sealed live plant display assembly as defined in claim 5 wherein the soil mixture consists essentially of about 85 percent compost, about 1 percent clay, about 5 percent sand, about 5 percent peat moss and about 3 percent sphagnum moss.

7. A sealed live plant display assembly as defined in claim 5, wherein the soil mixture consists essentially of about 1 percent clay, about 5 percent peat moss, about 3 percent sphagnum moss and a mixture of compost and sand comprising about 90 percent of said mixture, the ratio of sand to compost ranging from about 1:15 to about 10:9.

8. A sealed live plant display assembly as defined in claim 1 wherein the adhesive material is selected from the group consisting essentially of silicon rubber, rosin, beeswax and paraffin.

9. A sealed live plant display assembly as defined in claim 8 wherein the adhesive material is silicon rubber.

10. A method of manufacturing a sealed live plant display assembly comprising the steps of:
  a. preparing an ecologically balanced soil-animal mixture by;
    1. intermixing a major amount of organic material and a minor amount of inorganic material to form a soil mixture capable of supporting a live plant;
    2. sterilizing said soil mixture;
    3. adding a suitable animal life to said sterilized soil mixture in an amount sufficient to provide an effective symbiotic relation between the plant life and said animal life; and
    4. adjusting the amount of moisture in the soil-animal mixture to a predetermined degree;
  b. potting at least one live plant within said soil-animal mixture to define an ecologically balanced soil-animal-plant system; and
  c. substantially permanently sealing at least a portion of said ecologically balanced system within a substantially gas-impermeable hollow container composed at least partially of a material which transmits light to a degree sufficient for photosynthesis, whereby the interior of said display is an ecologically balanced self-supporting life system.

11. A method as defined in claim 10 wherein said container comprises at least two separate members, one member defining a chamber for said ecologically balanced system and the other member defining a cover for said chamber and said member being sealed to one another by an adhesive material characterized by substantial non-toxicity to said soil-animal-plant system.

12. A method as defined in claim 10 wherein a select amount of said soil-animal mixture is placed in said container and then said live plant is potted and sealed therein.

* * * * *